United States Patent

Thoonen

[15] 3,647,366

[45] Mar. 7, 1972

[54] PROCESS FOR THE PREPARATION OF ANHYDROUS ALUMINUM FLUORIDE

[72] Inventor: Theodorus J. Thoonen, Rotterdam, Netherlands

[73] Assignee: Verenigde Kunstmestfabrieken Mekog-Albatras N.V., Maliebaan, Utrecht, Netherlands

[22] Filed: Apr. 23, 1969

[21] Appl. No.: 818,785

Related U.S. Application Data

[63] Continuation-in-part of Ser. No. 634,859, May 1, 1967, abandoned.

[30] Foreign Application Priority Data

May 20, 1968 Netherlands..........................6807108

[52] U.S. Cl....................................23/88, 252/433, 252/442
[51] Int. Cl. ..........................................................C01f 7/50
[58] Field of Search........................23/88, 193; 252/433, 442

[56] References Cited

UNITED STATES PATENTS

| | | | |
|---|---|---|---|
| 1,300,110 | 4/1919 | Betts | 23/88 X |
| 2,075,370 | 3/1937 | Strathmeyer | 23/88 |
| 2,842,426 | 7/1958 | Glocker | 23/88 |
| 3,057,837 | 10/1962 | Calfee | 252/442 X |
| 3,175,882 | 3/1965 | Derr | 23/88 |
| 3,197,276 | 7/1965 | Forrat | 23/88 |

FOREIGN PATENTS OR APPLICATIONS

| | | | |
|---|---|---|---|
| 635,552 | 4/1950 | Great Britain | 23/88 |
| 782,423 | 9/1957 | Great Britain | 23/88 |
| 45,925 | 6/1962 | Poland | 23/88 |

*Primary Examiner*—Patrick P. Garvin
*Attorney*—Jones & Lockwood

[57] ABSTRACT

This disclosure is concerned with a process for the preparation of anhydrous aluminum fluoride, whereby an aqueous solution of ammonium fluoride is treated with at least approximately twice the quantity of an aluminum oxide required to form triammonium hexafluoroaluminate. The resulting intimate mixture of triammonium hexafluoroaluminate and unconverted aluminum oxide is separated from the mother liquor. The separated mixture is heated to decompose the triammonium hexafluoroaluminate to form aluminum fluoride. The anhydrous aluminum fluoride may be used as an auxiliary material in reducing aluminum oxide or as a catalyst in several chemical reactions.

13 Claims, No Drawings

PROCESS FOR THE PREPARATION OF ANHYDROUS ALUMINUM FLUORIDE

This application is a continuation-in-part of application Ser. No. —634,859, filed May 1, 1967, and how abandoned.

When phosphate ore is converted into soluble phosphorus compounds by reaction with sulphuric acid or other mineral acids, vapors containing $SiF_4$ and HF are produced from the resultant hot slurry. Similar vapors are also produced during the concentration of the phosphoric acid obtained in such a manner. During condensation and/or scrubbing of these vapors an aqueous solution is obtained, in which the fluorine is mainly present as $H_2SiF_6$. The solution can be treated, if necessary, after filtration, with an excess of ammonia, ammonium fluoride being formed and the silicon being precipitated as silicon oxide hydrate according to the equation:

$$H_2SiF_6 + 6NH_3 + (n+2)H_2O \rightarrow 6NH_4F + SiO_2 \cdot nH_2O.$$

After separation of the $SiO_2$ the $NH_4F$ solution can, if desired, be concentrated for instance to a concentration of 50 percent.

It is an object of the present invention to prepare anhydrous aluminum fluoride from aqueous solutions of ammonium fluoride and aluminum oxide.

Another object of the present invention is to prepare homogeneous mixtures of anhydrous aluminum fluoride and aluminum oxide. It is a further object of the present invention to prepare anhydrous aluminum fluoride in finely divided condition deposited on porous aluminum oxide and in the pores of such aluminum oxide.

The anhydrous aluminum fluoride is an important auxiliary material in the production of metallic aluminum by reduction of aluminum oxide.

Homogeneous mixtures of anhydrous aluminum fluoride and aluminum oxide and in particular such mixtures in which anhydrous aluminum fluoride is present in finely divided condition deposited on porous aluminum oxide and in the pores of such aluminum oxide are useful for catalyzing several chemical reactions.

As examples of chemical processes which can be catalyzed by $AlF_3$, organic vapor-phase reactions may be mentioned, such as the isomerization of olefins, e.g., the conversion of n-pentene into methyl butenes at 510° C. (J. R. Kaiser, L. D. Moore and R. C. Odioso, Industrial and Engineering Chemistry, Product Research and Development 1,127 (1962)). In such vapor-phase reactions the catalytic effect of $AlF_3$ can be rendered more selective by incorporating also certain promoters, such as tungsten, platinum, chromium or titanium into the $AlF_3$-based catalyst. Thus in the isomerization of olefins the presence of tungsten, platinum, chromium or titanium with $AlF_3$ will counteract side reactions, such as polymerization or cracking. Another gas-phase reaction catalyzed by $AlF_3$ is the addition of HF to acetylene at temperatures between 175° and 400° C. (U.S. Pat. No. 2,471,525).

Also catalyzed by $AlF_3$ is the polymerization of olefins and styrene, preferably in a liquid inert medium, for example a medium consisting of saturated aliphatic or cycloaliphatic hydrocarbons, at temperatures between −70° C. and 250° C. and pressures between atmospheric pressure and 4,000 p.s.i. In such polymerization processes the activity of $AlF_3$ may be improved by the presence of other halides, e.g. antimony pentachloride, antimony trichloride, boron trifluoride, tin tetrachloride, silicon tetrachloride, titanium tetrachloride, titanium trichloride, ferric chloride, aluminum bromide, chromium trichloride, zirconium tetrachloride and zinc chloride. Such processes are known from U.S. Pat. No. 3,057,837 and U.S. Pat. No. 3,138,578.

A still further object of the present invention is to prepare anhydrous aluminum fluoride containing finely divided therein one or more other substances, in particular other catalytically active substances, e.g. platinum, palladium, and compounds of tungsten, chromium, titanium, antimony, boron, tin, iron, zirconium, zinc, molybdenum, vanadium, and the lanthanides.

It is also an object of the invention to prepare homogeneous mixtures of anhydrous aluminum fluoride and aluminum oxide which mixtures also contain finely divided therein one or more of said other catalytically active components, in particular platinum, palladium and compounds of tungsten, chromium or titanium, antimony, boron, tin, iron, zirconium, zinc, molybdenum, vanadium, and the lathanides.

Other objects of the present invention will become apparent as this specification proceeds.

In the process of the present invention an aqueous solution containing ammonium fluoride is treated in a first step with at least approximately twice the quantity of aluminum oxide or aluminum oxide hydrate required for the formation of triammonium hexafluoroaluminate, whereupon the resultant mixture of triammonium hexafluoroaluminate and unconverted aluminum oxide or aluminum oxide hydrate is separated off, and dried and calcined in a second step. Approximately twice the quantity can be taken to mean 1.9 to 2.1 times the quantity concerned.

Use is preferably made of pure aluminum oxide or aluminum oxide hydrate, but raw materials containing aluminum oxide or aluminum oxide hydrate may likewise be used.

One advantage of the proposed process is that the aluminum fluoride is obtained directly in a form which is free of hydrate. Drying aluminum fluoride hydrates, as are obtained in other processes, is accompanied by losses of fluorine.

Addition of the total quantity of aluminum oxide or aluminum oxide hydrate in one step has also the advantage of simplicity of procedure. Separate actions, for feeding in the quantity of aluminum oxide required in the second step and mixing of the two components before the second step are avoided.

It was also found that it is advantageous in the first step to start from a product obtained from aluminum oxide dihydrate or trihydrate by a previous full or partial dehydration. As a result of the dehydration the process of the invention is accelerated. The dehydration may be achieved, for instance, by heating up to temperatures between approximately 280° and 350° C., for instance 300° C. Preferably the dehydration is effected to such extent that the residue substantially has a composition corresponding to that of boehmite, which may be symbolized as $AlO_2H$ or $Al_2O_3 \cdot H_2O$, or has a composition corresponding to a mixture of boehmite with anhydrous $Al_2O_3$. The residue as a whole in this case may generally correspond to $Al_2O_3 + pH_2O$ in which p is between 0.5 and 1.1. Excellent results are obtained starting from dihydrate or trihydrate if the dehydration is brought about by a gradual heating in which during the first hour the temperature does not exceed 230° C. and is maintained for instance at 200° C., whereas subsequently the temperature is raised to a level between 280° and 350° C., for instance about 300° C., and is maintained at about that level until a composition corresponding to boehmite is obtained. Heating up quickly at the beginning of dehydration entails the disadvantage of a weakening of the inner structure of the material. The dehydration under the preferred conditions as described may require as a whole 2 to 6 hours.

The reaction of the ammonium fluoride solution with aluminum oxide or its hydrate in the first step proceeds according to the equation:

$$6NH_4F + Al_2O_3 \cdot nH_2O \rightarrow (NH_4)_3AlF_6 + \tfrac{1}{2}(Al_2O_3) + 3NH_3 + (n+1\tfrac{1}{2})H_2O.$$

This step is effected preferably at temperatures between 65° C. and 125° C., a precipitate of triammonium hexafluoroaluminate, intimately mixed with unconverted aluminum oxide or aluminum oxide hydrate being virtually immediately formed under these conditions.

It is advisable to carry out the reaction in an ammoniacal medium, since this improves the mixing of triammonium hexafluoroaluminate and aluminum oxide. At concentrations of $NH_4F$ of 5 to 25 percent by weight in the aqueous phase a weight ratio of free $NH_3$ to $NH_4F$ of between 0.5:1 and 1.5:1;17 is suitable. The higher the concentration of $NH_4F$ the smaller is the requirement of free $NH_3$. At a concentration of more than 25 percent by weight of $NH_4F$ a weight ratio of free $NH_3$ to $NH_4F$ of from 0.25:1 to 0.5:1 is satisfactory. At a concentration of 20 percent by weight of $NH_4F$ the most favorable concentration of the free $NH_3$ is approximately 15 percent by weight. Use of a free $NH_3$ concentration above 15 percent with a $NH_4F$ concentration of 20 percent results in a lower rate of the reaction. Particularly, if temperatures above 100° C. are used it is advisable to carry out the reaction in a closed reaction vessel, since depending on the temperature used an elevated ammonia pressure develops, for example, as high as 10 atmospheres.

As a result of operating under elevated pressure and particularly with partially dehydrated aluminum oxide hydrate, such as may be obtained from Gibbsite, the intermediate product formed in the first step comprises granules which are homogeneously built up from $(NH_4)_3AlF_6$ and $Al_2O_3 \cdot xH_2O$ (x is preferably 1). During the reaction of the $NH_4F$ solution with partially dehydrated aluminum oxide the $NH_3$ evolved will develop pressure at the point of its formation, i.e. in the pores of the aluminum oxide, thus contributing to a change of the structure; $(NH_4)_3AlF_6$ apparently crystallizes out in the pores of the aluminum oxide thus forming an intimate mixture with it. This state of the intermediate product and its homogeneity are of great importance for a quantitative progress of the reaction in the second step.

The mixture, formed in the first step, of precipitated triammonium hexafluoroaluminate and unconverted aluminum oxide or its hydrate is separated from the mother liquor by filtration or centrifuging. After the filtration or centrifuging in this mixture usually still an amount of mother liquor is present, which contains dissolved triammonium hexafluoroaluminate. It is not necessary to wash out this amount of mother liquor.

In the second step the mixture is heated, preferably to temperatures between 480° C. and 550° C. Moreover, it is preferred to carry out this heating gradually or stepwise. In this way water which is not bound as hydrate escapes already at 100° C. At approximately 225° C. the triammonium hexafluoroaluminate is converted into monoammonium tetrafluoroaluminate, the conversion being represented by the equation:

$$2(NH_4)_3AlF_6 + Al_2O_3 \cdot xH_2O \rightarrow 3NH_4AlF_4 + \tfrac{1}{2}Al_2O_3 \cdot xH_2O + 3NH_3 + (\tfrac{1}{2}x + 1\tfrac{1}{2})H_2O.$$

At temperatures between 400° C. and 550° C. anhydrous aluminum fluoride is produced according to the equation:

$$3NH_4AlF_4 + \tfrac{1}{2}(Al_2O_3 \cdot xH_2O) \rightarrow 4AlF_3 + 3NH_3 + (\tfrac{1}{2}x + 1\tfrac{1}{2})H_2O.$$

It seems very likely that above 200° C. the following sequence of reactions proceeds; this is, however, not absolutely certain. For simplicity hydratation water of $Al_2O_3$ is not accounted for in the reaction equations.

a. $2(NH_4)_3AlF_6 + Al_2O_3 \rightarrow 3NH_4AlF_4 + \tfrac{1}{2}Al_2O_3 + 3NH_3 + 1\tfrac{1}{2}H_2O$
b. $3NH_4AlF_4 \rightarrow 3NH_4F + 3AlF_3$
c. $3NH_4F + \tfrac{1}{2}Al_2O_3 \rightleftharpoons (3NH_3 + 3HF + \tfrac{1}{2}Al_2O_3) \rightarrow AlF_3 + 3NH_3 + 1\tfrac{1}{2}H_2O$ At temperatures between 400° C. and 550° C. the formation of $AlF_3$ proceeds practically to completion. As a result of the reactants being intimately mixed, fluorine losses, if any, are very slight. The HF produced on heating is immediately seized by the aluminum oxide or its hydrate and has much less opportunity to escape than is the case in a known process in which a quantity of aluminum oxide or its hydrate is added to solid triammonium hexafluoroaluminate and these components are mixed mechanically and calcined.

Final temperatures in excess of 550° C. are possible, but melting of the mixture must be avoided. As a rule no temperatures are used which exceed 900° C.

If the heating in the second step is carried out gradually, that is in a period of at least 20 minutes, for instance up to 90 minutes, and if a temperature of 550° C. is not exceeded, $AlF_3$ is formed in a metastable modification, hereinafter referred to as $AlF_3$ II. Moreover, this procedure leads to products having approximately the same particle size as the aluminum oxide hydrate used and entirely free from dust. If the temperature is rapidly raised to 550° C. or if the mixture is heated to temperatures above 550° C. the stable modification of $AlF_3$ is obtained ($AlF_3$ I).

If pure $AlF_3$ is wanted the starting material is a mixture in which the molar ratio of $Al_2O_3$ to $NH_4F$ is exactly 1:6. If a greater amount of $Al_2O_3$ is used a rest of $Al_2O_3$ remains in the product. If a smaller quantity of $Al_2O_3$ is used than corresponds with the said ratio fluorine losses occur in the second step.

If $AlF_3$ is wanted for use as a catalyst and $Al_2O_3$ is wanted as a carrier, the molecular proportion in which $Al_2O_3$ and $NH_4F$ are introduced in the first step is higher than 1:6. The molecular proportion may be given any value up to for instance 30:6 or 60:6. A molecular proportion of 60:6 means that the amount of aluminum oxide or aluminum oxide hydrate used is 120 times the amount required for the formation of triammonium hexafluoroaluminate. The excess of $Al_2O_3$ which is not converted into $AlF_3$ will remain as $\chi$-$Al_2O_3$ and will serve as carrier or solid diluent in the final product. A great advantage is that the mixture obtained in this way is more homogeneous than ever can be achieved by mixing the $AlF_3$ and $Al_2O_3$ mechanically. Catalysts of high activity are obtained which is also due to the porous structure.

Instead of $Al_2O_3$ or in addition to it other carrier materials or solid diluents may be present in the final product, e.g. active carbon. These other carrier materials or solid diluent may be incorporated as well into the mixture in which triammonium hexafluoroaluminate is produced. The said other carrier materials or solid diluents also may be added in a later stage, for instance to the $AlF_3$ when ready.

The mixture of solids which is separated from the liquid at the end of the first reaction step may be granulated or pelletized, preferably when the mixture is still in a humid condition. The granules or pellets may subsequently be heated to allow the second reaction step to proceed, in which the granular or pellet form is retained, but a porous structure is formed owing to the escape of ammonia and water vapor. The granular or pellet form is particularly suitable for use of the product as catalyst. It is, of course, also possible to refrain from granulation or pelletization of the product of the first step and to apply granulation or pelletization methods to the final product instead.

The present process for the production of anhydrous $AlF_3$ or mixtures containing this $AlF_3$, is eminently adapted to incorporate into these products substances bringing about or enhancing catalytic activity. Said substances bringing about or enhancing catalytic activity will hereinafter be called promoters. Examples of such promoters are platinum and palladium, and compounds of tungsten, molybdenum, chromium, titanium, vanadium, antimony, tin, iron, zirconium and the lanthanides.

Promoters or their precursors (i.e. substances which in the course of the process are being converted into promoters) may be incorporated into the mixture in which the first step of the present process, i.e. the preparation of triammonium hexaflouroaluminate is carried out. Promoters or precursors not soluble in water may be homogeneously divided in the mixture by stirring. They may also be admixed previously to the aluminum oxide or aluminum oxide hydrate, and even to the aluminum oxide before its dehydration.

Soluble salts of promoter elements may be admixed with the aqueous solution of ammonium fluoride whereupon insoluble hydroxides of the promoter elements may be precipitated by the addition of ammonia or other alkaline substance. When the alkaline substance is added to the solution in the presence of the aluminum oxide, the insoluble hydroxide is precipitated upon the aluminum oxide. If in that case sufficient stirring is applied a homogneeous distribution of the promoters over the aluminum oxide is easily obtained. If the soluble salts of the promoter elements are fluorides the conversion thereof with ammonia does not leave contamination.

The aluminum oxide or aluminum oxide hydrate, before being introduced in the first step of the present process, or preferably even before the preceding dehydration, may also be impregnated with an aqueous solution of a promoter or a precursor thereof. Thus a partially dehydrated Gibbsite may be impregnated with a solution of chromic acid and dried and heated, for instance up to 300° C. thereupon.

Solutions of promoters or their precursors may also be used for impregnation of the mixture of solids which is separated from the liquid at the end of the first reaction step. This method of introducing promoters is particularly suitable if the promoters are expensive, such as in the case of platinum, and the risk of loss should be avoided as much as possible.

Compositions comprising $AlF_3$ II and one or more of the above-mentioned promoters are novel compositions. These compositions may contain $Al_2O_3$ or not.

EXAMPLE I

Gibbsite ($Al_2O_3 \cdot 3H_2O$) was dehydrated for 70 percent by heating 1 hour at 205° C. and thereafter increasing the temperature to 300° C.

To 1 liter of aqueous ammonium fluoride solution, containing 118 g. of bound F and 200 g. of free $NH_3$, enough of the partially dehydrated Gibbsite was added to ensure that 104 g. of $Al_2O_3$ were present. The mixture was heated with stirring to 100° C., for ¾ hour, whereby a precipitate was formed consisting of 195 g. of triammonium hexaflouroaluminate distributed over 51 g. of unconverted aluminum oxide hydrate (calculated as $Al_2O_3$). As a consequence of the solubility of the triammonium flouroaluminate 7 g. of this salt remained in solution.

The resultant precipitate was separated from the mother liquor by means of filtration. It comprised 95 percent of solid substance and 5 percent of mother liquor, which did not require to be washed out.

In the following step the precipitate was heated to 500° C. in the course of 60 minutes.

The resultant final product (166 g.) contained 163.6 g. of $AlF_3$ and 2.7 g. of $Al_2O_3$. Thus in this second step less than 3 g. of the 118 g. of F originally introduced escaped in the gaseous phase, mixed with 51 g. of ammonia and water vapor. The resultant vapor mixture, which consists substantially of $NH_3$ and $H_2O$, can be used for the preparation of ammonium fluoride solutions from aqueous solutions containing $H_2SiF_6$, as referred to in the introductory part of this description.

EXAMPLE II

To 1 liter of aqueous $NH_4F$ solution, containing 200 g. of bound F and 110 g. of free $NH_3$, enough of an aluminum oxide hydrate (Gibbsite dehydrated for 70 percent as in Example I) was added to ensure that 177 g. of $Al_2O_3$ were present. On heating to 105° C. for ¾ hour in a closed reaction vessel, in which a pressure of 7 atmospheres developed, a precipitate formed, consisting of 336 g. of triammonium hexaflouroaluminate, intimately mixed with 88 g. of unconverted partially dehydrated Gibbsite (calculated as $Al_2O_3$).

As a consequence of the solubility of triammonium flouroaluminate 6 g. of this salt remained in solution.

The resultant precipitate was separated from the mother liquor. It comprised 95 percent of solid material and 5 percent of mother liquor, which did not require to be washed out.

The subsequent heating was carried out in the same manner as described in Example I.

The resultant final product (290 g.) consisted exclusively of $AlF_3$. Of the 200 g. of F originally introduced virtually no fluorine escaped from the reaction mixture; only ammonia (88 g.) and water vapor escaped.

The aluminum fluoride prepared in this example is a metastable modification ($AlF_3$ II) which possesses a special structure, whereas in conventional processes for the preparation of $AlF_3$ the stable modification ($AlF_3$ I) is obtained. $AlF_3$ II is distinguished from $AlF_3$ I by its specific gravity (approximately 2.43 instead of approx. 3.19) and by its X-ray diffraction pattern (d value).

TABLE

Comparison of the X-ray diffraction patterns of $AlF_3$ I and $AlF_3$ II

| $AlF_3$ I according to Anal. Chem. 29 (1957) 984 | | $AlF_3$ II according to the observations made by the Applicant | |
|---|---|---|---|
| d | I | d | I |
|  |  | 6.02 | 82 |
| 3.52 | 100 | 3.558 | 100 |
|  |  | 3.465 | 8 |
|  |  | 3.006 | 44 |
| 2.512 | 2 | 2.480 | 2 |
|  |  | 2.29 | 3 |
|  |  | 2.27 | 4 |
|  |  | 2.195 | 4 |
|  |  | 2.165 | 4 |
| 2.119 | 19 | 2.120 | 3 |
| 2.074 | 2 | 2.000 | 12 |
| 2.019 | 1 | 1.913 | 12 |
|  |  | 1.778 | 22 |
| 1.759 | 24 | 1.735 | 21 |
|  |  | 1.708 | 5 |
| 1.600 | 2 | 1.667 | 8 |
| 1.587 | 14 | 1.584 | 5 |
| 1.560 | 7 | 1.557 | 5 |
|  |  | 1.531 | 12 |
| 1.460 | 1 | 1.504 | 11 |
|  |  | 1.381 | 5 |

EXAMPLE III

Gibbsite was dehydrated by heating during 80 minutes at 200° C., thereafter increasing the temperature to 330° C. and maintaining the temperature of 330° C. until 80 percent of the hydration water had evaporated.

The procedure of Example II was repeated using the 80 percent dehydrated Gibbsite instead of the 70 percent dehydrated Gibbsite.

The final product was very pure anhydrous aluminum fluoride (290 g.).

EXAMPLE IV

Gibbsite was dehydrated by heating during 55 minutes at 200° C., thereafter increasing the temperature to 290° C. and maintaining the temperature of 290° C. until 56 percent of the hydration water had evaporated.

The procedure of Example II was repeated using the 56 percent dehydrated Gibbsite instead of the 70 percent dehydrated Gibbsite. The result was similar to that of Example II.

EXAMPLE V

Use was made of Gibbsite, dehydrated for 70 percent, as described in Example I.

To 2.5 liters of aqueous $NH_4F$ solution, containing 37 g. $NH_4F$ and 400 g. of free $NH_3$, 788 g. of the partially dehydrated Gibbsite was added. On heating for 1 hour at 120° C. in a closed vessel the mixture of solids obtained was separated from the aqueous solution, dried and heated with the temperature gradually being raised to 500° C. in the course of 1 hour.

The product was aluminum oxide containing 3.3 percent of anhydrous $AlF_3$ very homogeneously distributed. This product proved to be a very active catalyst in the isomerization of olefins with four to six carbon atoms at 500° C.

EXAMPLE VI

To a solution of 200 grams of $NH_4F$ and 15 grams of $TiF_4$ (or 25 grams of $(NH_4)_2TiF_6$) in 1 liter of water were added 280 grams of 70 percent dehydrated Gibbsite, obtained by gradually heating 371 grams of Gibbsite up to 300° C. The suspension was heated with stirring to 110° C. for 50 minutes in an autoclave. The resultant precipitate consisting of $(NH_4)_3AlF_6$, boehmite, $\chi-Al_2O_3$ and finely divided $TiO_2$ was filtered off, dried and heated, initially to temperatures not exceeding 230° C. until the weight remained constant. Subsequently the temperature was raised to 500° C. over a period of 40 minutes. The product proved to be a highly active catalyst in the isomerization of olefins with four to six carbon atoms at 500° C.

The required $TiF_4$ can be obtained by dissolving $TiO_2$ in a 35 percent aqueous HF-solution. $(NH_4)_2TiF_6$ can be prepared by reacting a $NH_4HF_2$-solution with $TiO_2$ according to the equation:

$$TiO_2 + NH_4HF_2 \rightarrow (NH_4)_2TiF_6 + NH_3 + 2H_2O.$$

EXAMPLE VII

To a solution of 200 grams of $NH_4F$ in 1 liter of water were added 121 grams of partially dehydrated aluminum oxide which had previously been prepared by heating 160 grams of Gibbsite gradually up to 300° C. The suspension was heated for 1 hour with stirring to 110° C. in an autoclave. The resultant precipitate was filtered off and mixed, while still in the wet condition, with 20 grams of a solution of $H_2PtCl_6$, containing 0.84 grams of platinum. The wet mass was subsequently dried and pressed into pellets. These were calcined in an oven, in which the temperature was allowed to rise to 230° C. during a first period of 45 minutes and to 500° C. during a subsequent period of 45 minutes.

Again a highly active catalyst was obtained.

EXAMPLE VIII

A quantity of 2,220 grams of Gibbsite was partially dehydrated by gradually heating up to 300° C. During heating the weight decreased to 1,705 grams. 22 grams of chromium oxide ($Cr_2O_3$) were uniformly distributed over this quantity of the partially dehydrated product. To this end the partially dehydrated Gibbsite was suspended in a solution of 29 grams of chromium trioxide ($CrO_3$) in water and the suspension was subsequently evaporated to dryness, with stirring. The dry mixture was heated to 300° C., during which heating the weight decreased to 1,727 grams.

The mixture was added to a solution of 200 grams of $NH_4F$ in water and the suspension was heated for 1 hour to 110° C. with stirring in an autoclave. The resultant precipitate consisting of $(NH_4)_3AlF_6$, boehmite, $\chi-Al_2O_3$ and $Cr_2O_3$ was filtered off, dried and pelletized. The pellets were further treated as those of Example VII.

Again the product was a highly active catalyst.

EXAMPLE IX 1,110 grams of Gibbsite were dehydrated by gradually heating up to 300° C, whereby the weight decreased to 855 grams. The dehydrated product was suspended in an aqueous solution of ammoniummetatungstate containing 130 g. of W. The suspension was evaporated to dryness with stirring. The dry mixture was heated gradually to 300° C., the weight decreasing to 1,019 grams. It contained 164 grams of $WO_3$.

The dry mixture was suspended in an aqueous solution of 200 grams of $NH_4F$ and the suspension was heated for 1 hour to 115° C. in an autoclave with stirring. The mixture of solids separated subsequently from the liquid was dried and pelletized. The pellets were further treated as those of Example VII.

The product was a satisfactory catalyst.

I claim:
1. A process for the conversion of ammonium fluoride and an aluminum oxide into anhydrous aluminum fluoride by the intermediate formation of triammonium hexafluoroaluminate, which comprises the steps of
   A. treating an aqueous solution of ammonium fluoride with a quantity of aluminum oxide or aluminum oxide hydrate which is between approximately twice and one hundred and twenty times that required for the formation of triammonium hexafluoroaluminate, whereby an intimate mixture of triammonium hexafluoroaluminate and unconverted aluminum oxide or aluminum oxide hydrate is formed;
   B. separating the so-formed mixture of triammonium hexafluoroaluminate and unconverted aluminum oxide hydrate from its mother liquor, and
   C. heating the mixture of triammonium hexafluoroaluminate and unconverted aluminum oxide or aluminum oxide hydrate to a temperature between 400° C. and the melting point of the mixture, whereby the triammonium hexafluoroaluminate is decomposed to form aluminum fluoride.

2. The process of claim 1, wherein the treatment of ammonium fluoride with the aluminum oxide is conducted in an aqueous ammoniacal solution having a weight ratio of free ammonia to ammonium fluoride in the range of between 0.5:1 and 1.5:1, and the concentration of ammonium fluoride is between 5 and 25 weight percent.

3. The process of claim 1, wherein the treatment of ammonium fluoride and the aluminum oxide is conducted in an aqueous ammoniacal solution having a weight ratio of free ammonia to ammonium fluoride in the range of between 0.25:1 and 0.5:1, and the concentration of ammonium fluoride is above 25 weight percent.

4. The process of claim 1, wherein an aluminum oxide is used which has been previously treated to dehydrate it.

5. The process of claim 1, wherein an aluminum oxide is used containing between 0.5 and 1.1 mol of $H_2O$ pro mol $Al_2O_3$ and which has been obtained from an aluminum oxide hydrate richer in $H_2O$ by partial dehydration.

6. The process of claim 1, wherein an aluminum oxide is used which has been previously heated to dehydrate it, the heating being carried out in such a way, that during the first hour the temperature of 230° C. is not surpassed.

7. The process of claim 1, wherein the treatment of the ammonium fluoride solution with the aluminum oxide or hydrate thereof is carried out at a temperature in the range of between 65° C. and 125° C.

8. The process of claim 1, wherein the treatment of the ammonium fluoride solution with the aluminum oxide or hydrate thereof is conducted under pressure in a closed reaction vessel.

9. The process of claim 1, wherein the heating of the mixture of triammonium hexafluoroaluminate and unconverted aluminum oxide or aluminum oxide hydrate is conducted at a temperature range of between about 480° C. and 550° C.

10. The process of claim 1, wherein the aluminum fluoride is formed in a metastable modification by heating the mixture of triammonium hexafluoroaluminate and aluminum oxide or aluminum oxide hydrate to temperatures between 480° C. and 550° C. gradually or stepwise in a period lasting at least 20 minutes.

11. The process of claim 1, wherein the mixture of solids obtained in step B is granulated or pelletized.

12. The process of claim 11, wherein the mixture of solids obtained in step B is granulated or pelletized while being still humid.

13. A process for the preparation of anhydrous aluminum fluoride from ammonium fluoride and an aluminum oxide by the intermediate formation of triammonium hexafluoroaluminate, which comprises the steps of
   A. treating an aqueous solution of ammonium fluoride with a quantity of aluminum oxide or aluminum oxide hydrate at least approximately twice that required for the formation of triammonium hexafluoroaluminate, whereby an intimate mixture of triammonium hexafluoroaluminate and unconverted aluminum oxide or aluminum oxide hydrate is formed.
   B. separating the so-formed mixture of triammonium hexafluoroaluminate and unconverted aluminum oxide or aluminum oxide hydrate from its mother liquor, and C. heating the mixture of triammonium hexafluoroaluminate and unconverted aluminum oxide or aluminum oxide hydrate up to about 900° C., whereby the triammonium hexafluoroaluminate is decomposed to form aluminum fluoride.

* * * * *